United States Patent [19]
Goldfarb

[11] Patent Number: 5,752,341
[45] Date of Patent: May 19, 1998

[54] RADIAL GARDEN

[76] Inventor: Kenneth Goldfarb, 20 York Ave., Monticello, N.Y. 12701

[21] Appl. No.: 771,397

[22] Filed: Dec. 19, 1996

[51] Int. Cl.$^6$ ................................................. A01G 9/02
[52] U.S. Cl. ........................ 47/78; 47/47; 47/70
[58] Field of Search ........................ 47/78, 70, 44, 47/47; 248/156

[56] References Cited

U.S. PATENT DOCUMENTS

| | | | |
|---|---|---|---|
| H824 | 10/1990 | Ghafoovzai | 47/70 |
| 221,620 | 11/1879 | Sikes . | |
| 377,444 | 2/1888 | Watrous . | |
| 619,379 | 2/1899 | Williams et al. . | |
| 1,480,917 | 1/1924 | Robinson . | |
| 1,974,367 | 9/1934 | Schaible . | |
| 3,119,202 | 1/1964 | Harders | 47/47 |
| 3,935,671 | 2/1976 | Soot | 47/70 |
| 4,096,662 | 6/1978 | Anderson | 47/78 |
| 4,610,107 | 9/1986 | Testa | 47/47 |
| 5,276,996 | 1/1994 | Lee | 47/47 |

FOREIGN PATENT DOCUMENTS

| | | | |
|---|---|---|---|
| 4121597 | 1/1993 | Germany | 47/70 |
| 116761 | 11/1925 | Switzerland | 47/70 |

*Primary Examiner*—Randolph A. Reese
*Assistant Examiner*—Joanne C. Downs
*Attorney, Agent, or Firm*—Sandra M. Kotin

[57] ABSTRACT

A radial garden support system for climbing plants and non-climbing plants that can be used directly on the ground, with or without planting containers, and can also be used on a deck or patio with planting containers. Adjustable upper and lower radial arms support the climbing surface to meet the vertical needs of the climbing plants chosen. Leveling screws on the lower radial arms maintain proper orientation of the system on uneven ground. Triangular planting containers fit between the lower radial arms defining the growing area and resulting in less weeds and decreased quantities of water and fertilizer. Removable greenhouse tents fit within each planting container and enable early plantings, therefore increasing the growing season. A watering collar introduces water directly to the roots of the plants and enables introduction of plant food to the roots minimizing water and plant food requirements.

15 Claims, 4 Drawing Sheets

RADIAL GARDEN

FIELD OF THE INVENTION

The instant invention relates to a leveled radial support for climbing plants with an arrangement of planters that provides maximum planting capabilities in a minimal gardening area using in-ground planting containers or patio planting pots.

BACKGROUND OF THE INVENTION

Many types of plants require support for optimum growth. That support can take the form of a fence, a trellis, a nearby tree, or a string or wire in a vertical or angled orientation. When the support is to be erected, the requirements of the specific type of plant must be considered. A variety of plant supports are found in the art. Trellises, arbors and horizontal strings or wires supported on vertical posts are well known.

Sikes (U.S. Pat. No. 221,620) teaches a stake to be driven into the ground to which a unit consisting of horizontal bars with additional vertical posts can be attached to extend the support capacity. Hoops can be affixed to the stake by fitting into dove-tailed notches located at several levels along its length to provide support for a single plant as that plant grows. Harders (U.S. Pat. No. 3,119,202) developed a three dimensional trellis to be used in any open area. A central post is set into the ground and perpendicular sets of trellis arms are bolted to the upper portion of the post. The trellis arms fan outwardly and are collapsible for easy assembly and removal.

In U.S. Pat. No. 619,379 Williams et al. teaches the use of vertical posts embedded into the ground and supported at ground level by radiating braces. Horizontal runners extend from post to post and adjustable wire legs extend from the runners and are anchored into the ground. If one row of legs is used the legs are vertical, and if two rows are attached to the runners they are angled outwardly and extend from each side of the system. This system can be sized from a few feet to eleven feet in height, and uses two vertical posts or a long line of posts. Using a smaller system, Robinson, in U.S. Pat. No. 1,480,917, teaches a plant support for greenhouses utilizing an elevated plant bed with braced stand posts at each corner. The stand posts have teeth along their outside surface that mesh with a gear. There are a series of frames at different levels. The frames can be raised or lowered using a crank that turns the gear. Wires stretched from frame to frame at each level provide the plant support, and the frames can be raised as the plants grow.

In U.S. Pat. No. 377,444 Waltrous shows a wire support unit with spaced hooks. One unit can be attached to a building and another anchored into the ground where string or wire can be laced back and forth from one to the other to provide the plant support. One wire support unit can be attached to a disc mounted on a pole and another anchored into the ground around the pole with the lacing providing support around the pole. Similar circular support systems are taught by Schaible (U.S. Pat. No. 1,974,367) and Testa (U.S. Pat. No. 4,610,107).

There is a need for a sturdy support that can be used for a variety of plants and with the flexiblity to be used for in-ground plantings and for potted plantings on a deck or patio and that additionally provides for maximum growing capacity in a minimum growing area. There is a need for such a system that also provides covers for early outdoor planting and a watering accessory permitting maximum water utilization with minimal waste.

BRIEF SUMMARY OF THE INVENTION

The present invention relates to a leveled radially oriented plant support system for use in gardens and on decks and patios. The system can be erected quickly and easily and can be taken down with equal ease. There are upper and lower radial arms supported by a central post. The lower radial arms are equipped with leveling screws to maintain horizontal orientation and to assist in providing support and stability to the central post. Planters are set between the lower radial arms. The system enables climbing plants and non-climbing plants to be grown in the same planters which maximizes the number of plants that can be grown in a small area. Small plant tents or "greenhouses" permit early planting and a ground watering apparatus saves on the amount of water needed without depriving the plants of sufficient water for optimum growing conditions and permits the introduction of fertilizer directly to the roots. The use of planters diminishes the number of weeds and reduces the fertilizer and water requirements.

It is an object of the present invention to provide a radial plant support that can be used in a garden or on a deck or patio and which is equipped with leveling devices to compensate for uneven surfaces.

It is a further object of the present system to have the radial supports vertically adjustable so that a variety of plants can be accommodated and plants can be supported from seedling stage to full growth.

A further object of the present invention is the abililty to utilize various screens, strings and meshes as the support surfaces depending on the requirements of the specific plants to be grown.

It is a further object of the present invention to enable the maximum number of plants to be grown in a small planting area.

Another object of the present invention is to provide individual tents or greenhouses for each planter so that plants can be started early and to accommodate different plant requirements in each planter.

It is a still further object of the present invention that the tents can be used off-season to assist in killing soil-bourne microorganisms using the heat and steam generated from the "greenhouse" effect.

Another object of the present invention is to use bottomless planters so that the quantity of potting soil can be kept to a minimum and the plants' roots have deep reaching capabilities.

It is a further object of the present invention to enable use of minimum fertilizer and water because they remain concentrated within the planters and go directly to the roots of the plants.

It is a still further object of the present invention to provide a garden with side barriers to the growing areas to minimize weed infiltration.

Another object of the present invention is to have a plant support system that is easy to erect and to disassemble and store.

An object of the present invention is to provide a plant support sytem that is inexpensive and easy to manufacture.

Further objects and advantages of the present invention will become apparent from the following description and drawings.

DETAILED DESCRIPTION OF THE INVENTION

Figures 1, 2:
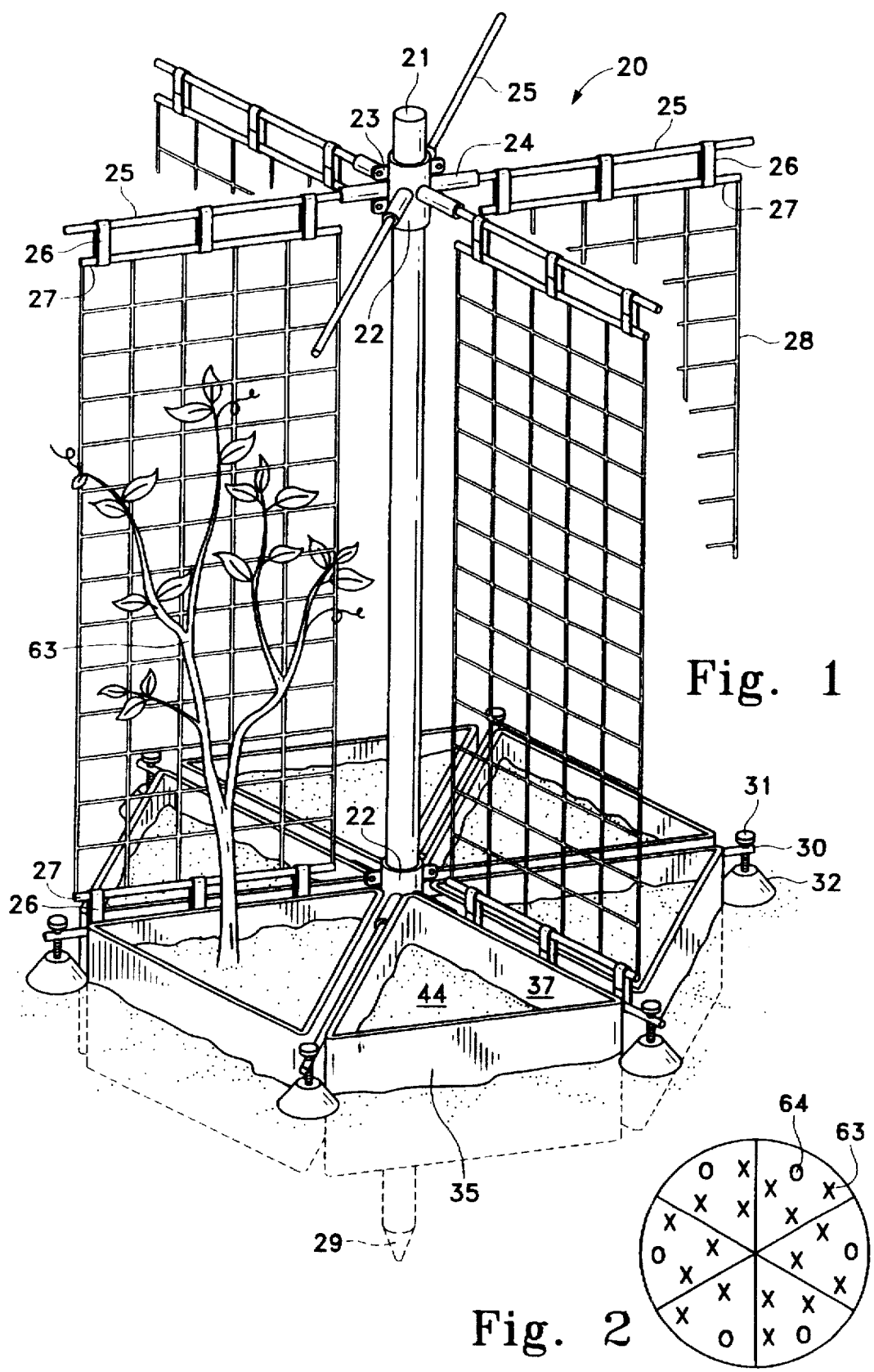
FIG. 1 is a perspective view of the system of the present invention using partially imbedded open bottom planters.
FIG. 2 is a schematic diagram of an optimal planting arrangement combining climbing plants and non-climbing plants.

The preferred embodiments of the instant invention can be seen in the accompanying drawings wherein similar reference characters are used to designate corresponding parts in all of the views.

Figure 4:
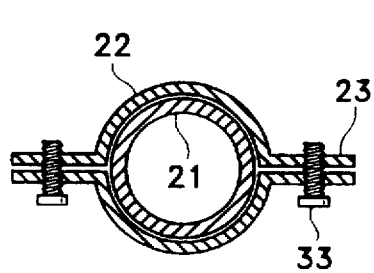
FIG. 4 is a horizontal sectional view of the radial support bracket taken along line 4—4 of FIG. 3.
Figure 5:
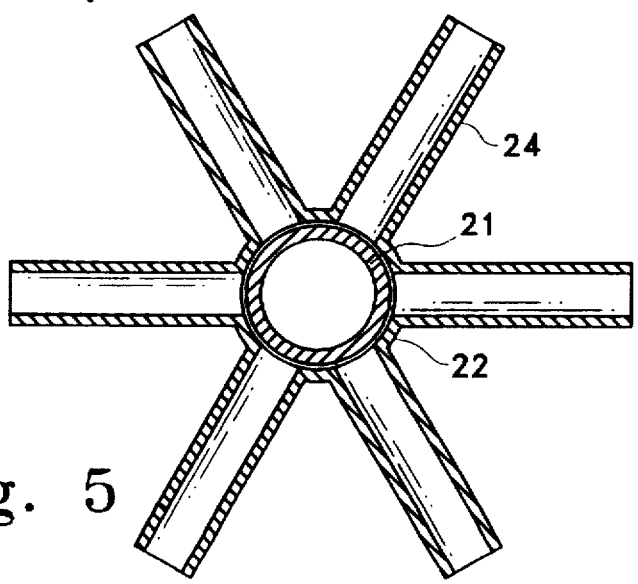
FIG. 5 is a horizontal sectional view of the radial support bracket taken along line 5–5 of FIG. 3.

The radial garden 20 is seen in FIG. 1. This garden is shown on the ground where a central support post 21 is embedded into the earth aided by a pointed end 29. By embedding a substantial length of the support post into the earth, the system is horizontally restrained from tipping due to lateral forces such as strong winds. The support post 21 can be made in sections to be adjustable to various heights, or in a single section as illustrated. There are two radial support brackets 22 affixed to the post 21, one at the upper end and the other at the lower end, at or immediately above ground level. Each bracket 22 is composed of two identical halves which when used together form a cylinder around the post 21. There are two lugs 23 on the edges of each half. Each has an opening through which a coupling screw 33 is inserted to hold the halves together. (See FIGS. 3 and 4) Each half also has three radial sleeves 24 equidistant from each other and disposed about the midsection of the bracket 22. (See FIGS. 3 and 5)

A radial arm is supported in each sleeve 24. The upper radial arms 25 are rods which support the climbing surface. Spaced evenly along each upper radial arm 25 are several fastening tabs 26. These tabs can be strips of material that can be tied together or strips containing hook and loop type fastener at opposite ends that can unite to form a holding loop. The lower radial arms 30 have fastening tabs 26 correspondingly spaced along their lengths. There are also openings near the distal end of each lower radial arm 30 through which a leveling screw 31 passes and enters a leveling base 32. These permit the support system to be properly leveled to compensate for an uneven ground surface. It is essential to the support of the radial garden 20 that the upper radial arms 25 and lower radial arms 30 be horizontal. The leveling screws 31 assure that this is accomplished.

Figure 3:
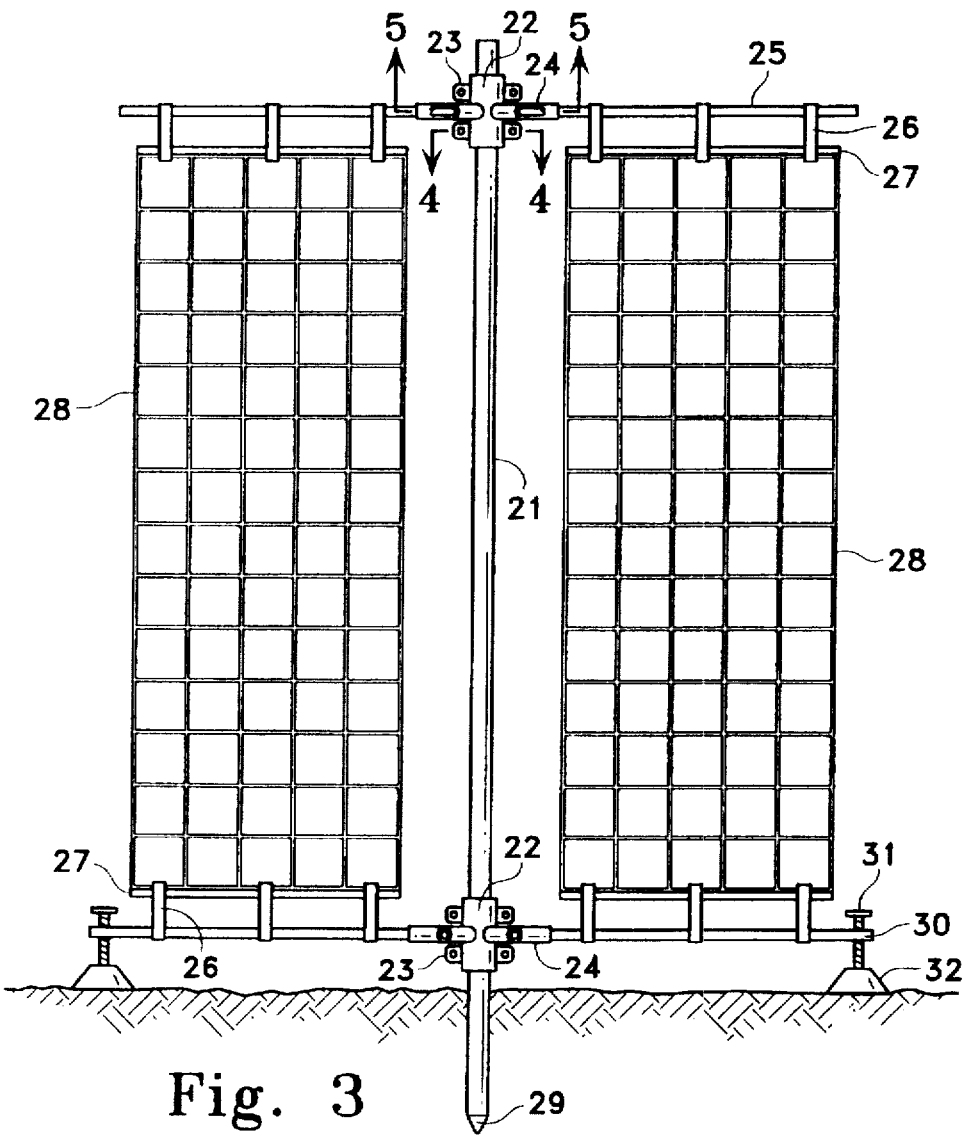
FIG. 3 is a side elevational view of the system of FIG. 1 without the planters.
Figure 9:
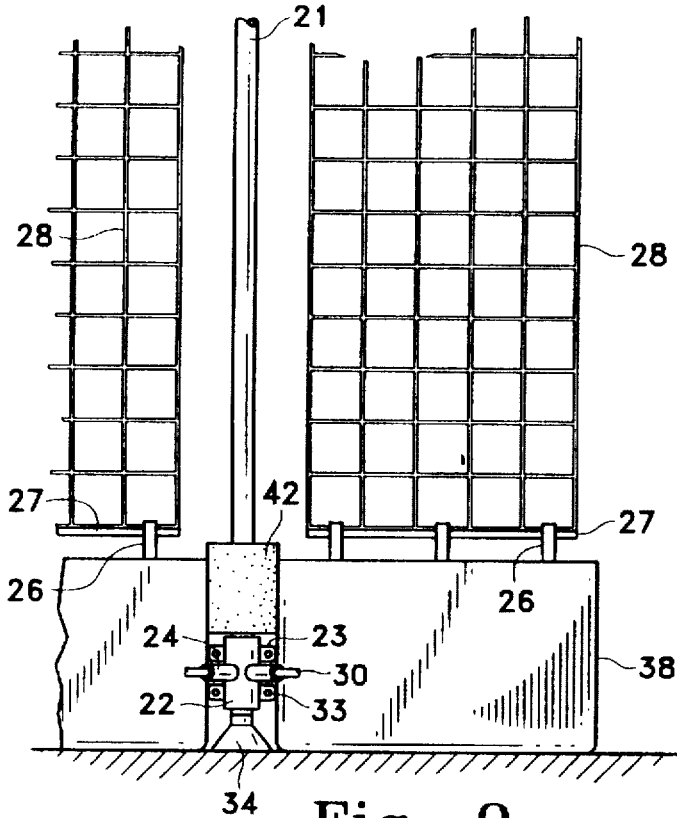
FIG. 9 is a side elevational view of the system of the present invention showing a close-up of the lower portion and the planters as used on a patio.

The climbing surface is flexible and can be a screen, a series of vertical strings or wires, or a wide mesh 28 as illustrated (FIGS. 1, 3 and 9) The mesh is attached to and suspended between two rods 27. When the radial garden 20 is assembled, the rods 27 are held in place between the upper radial arms 25 and lower radial arms 30 by the fastening tabs 26. The height of the radial support brackets 22 can be adjusted to accommodate the type of plants grown and so the climbing mesh 28 is taut. (FIG. 3)

Figure 6:
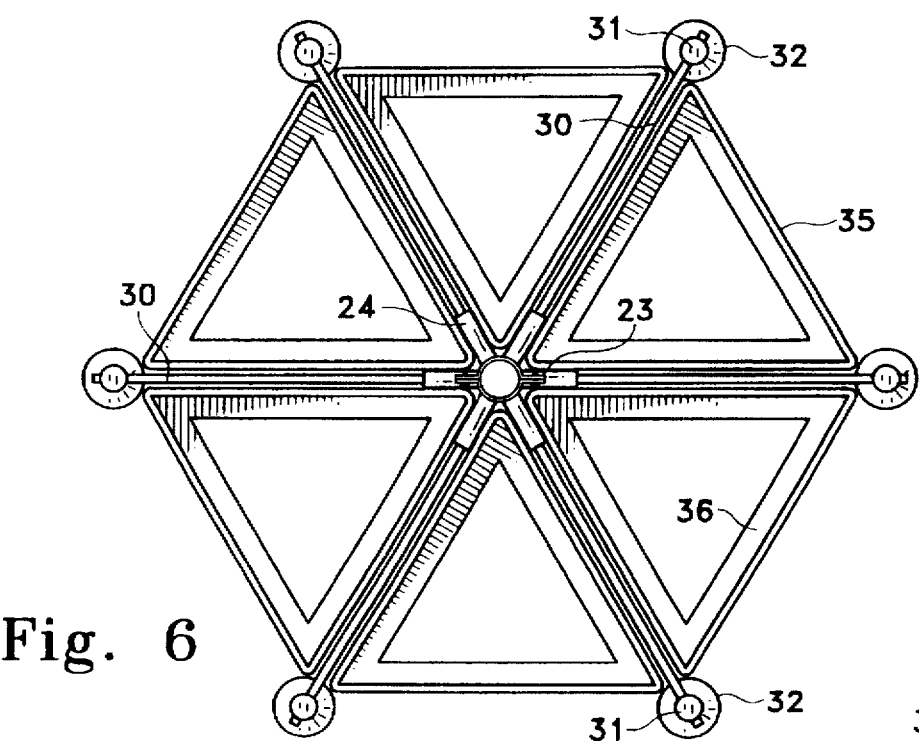
FIG. 6 is a top plan view of the lower portion of the system of FIG. 1.
Figure 7:
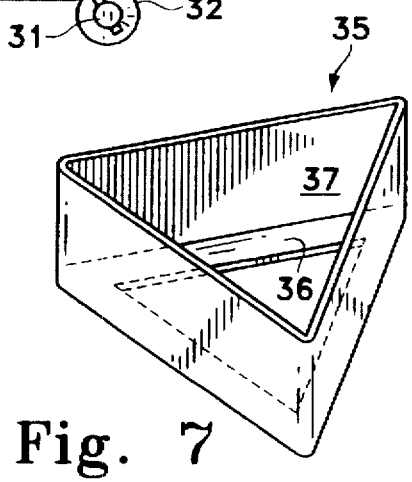
FIG. 7 is a perspective view of an open bottom planter.

The radial support assembly described above can be used with plantings directly in the ground, but to provide a more efficient garden, a garden that does not require constant weeding, and a garden that can be well maintained with limited fertilization and watering, planters are used. The best planters for use on the ground are triangular bottomless pots 35 that have a support rim 36 about the lower inner circumference. (See FIG. 7) When filled, the weight of the soil 44 on the rim 36 and against the walls 37 holds the pot in place. These bottomless pots 35 can be set on the ground, but are best partially submerged into the ground as seen in FIG. 1. The walls 37 of the pots prevent the potting soil from being washed out and prevent weeds from getting into the growing areas. The open bottoms of the pots allow the roots of the plants additional growing space and provide good drainage, especially in high precipitation areas. The bottomless pots 35 are placed between the lower radial arms 30 and next to the lower radial support bracket 22 as seen in FIG. 6.

Figure 8:
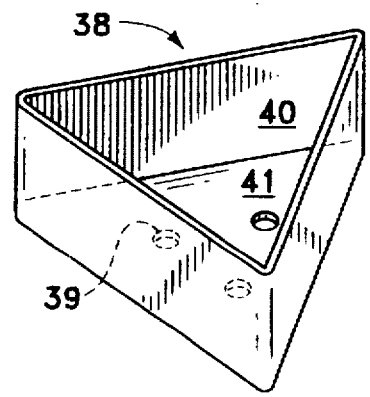
FIG. 8 is a perspective view of a closed bottom planter also showing drainage openings.
Figure 12:
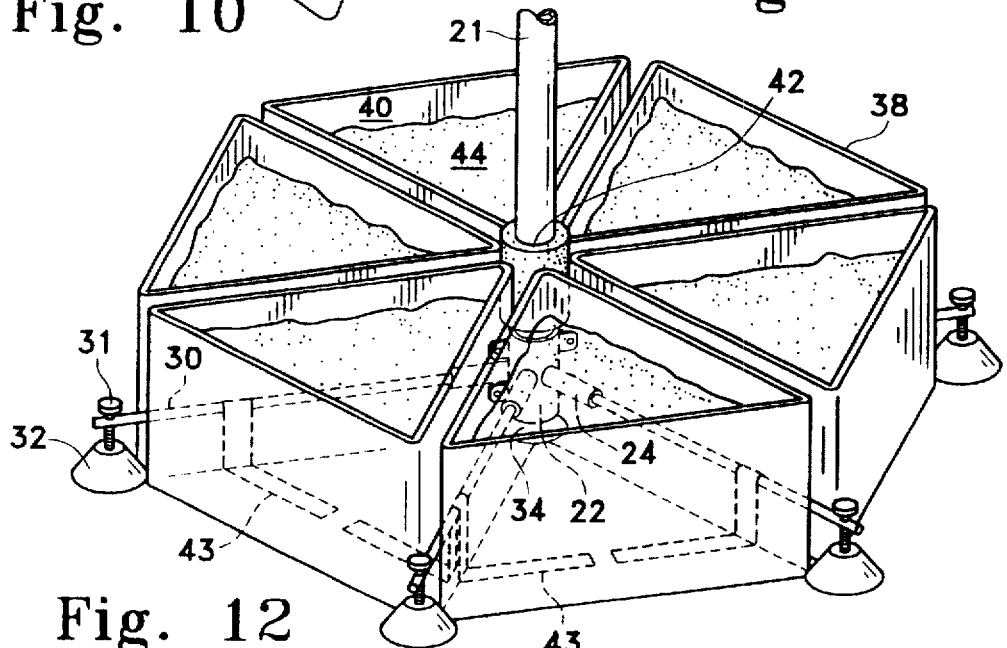
FIG. 12 is a perspective view of the lower portion of the present invention, without the climbing screens, as used on a patio, with two of the closed bottom planters cut away to show the support strips placed over the lower radial support arms.

When the garden is to be set up on a patio or deck a support base 34 is used for added stability. The bottom end of the central post 21 is set into the support base 34. This can be seen in FIGS. 9 and 12. The planters or patio pots 38 used in a patio or deck garden have three walls 40, and a bottom 41 with one or more drainage openings 39 as seen in FIG. 8. These patio pots 38 fit between the lower radial arms 30 as previously described.

For patio or deck use, the central post 21 is no longer embedded into the ground and the support system is more vulnerable to being tipped over in high winds, especially when there are plants climbing on all of the mesh surfaces. Additional provisions are made to insure stability to the system. A cylindrical support collar 42 is fitted around the central post and rests above the lower radial support bracket 22. This support collar 42 is made of a polymeric material and when the patio pots 38 are filled and set against the collar they add a great deal of weight against the lower portion of the central post 21 and provide the necessary restraint thereto. (See FIGS. 9 and 12) Additionally, to anchor the lower radial arms 30, anchoring strips 43 consisting of strips of sturdy material such as canvas or heavy flexible plastic at least as long as one wall of the patio pot are used. The center of an anchoring strip 43 is placed over the distal end of each lower radial arm 30, and the ends of the strips are extended to rest under the patio pots 38. When the pots are filled with soil, their weight holds the strips down and anchors the lower radial arms to prevent tipping. The anchoring strips can be seen in FIG. 12.

Figure 10:
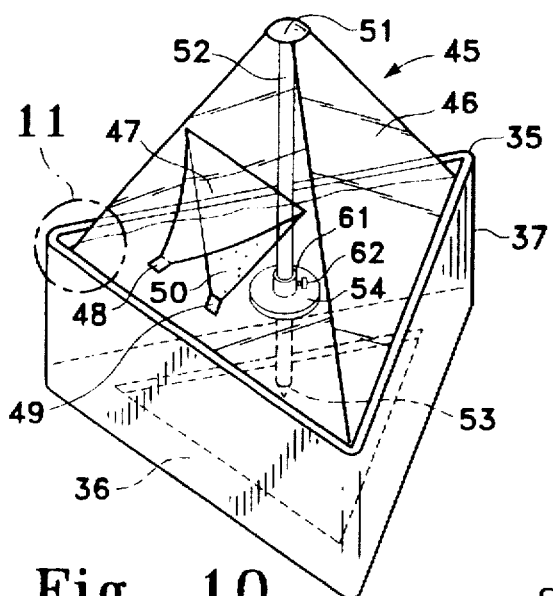
FIG. 10 is a perspective transparent view of an open bottom planter with the greenhouse tent in place.
Figure 11:
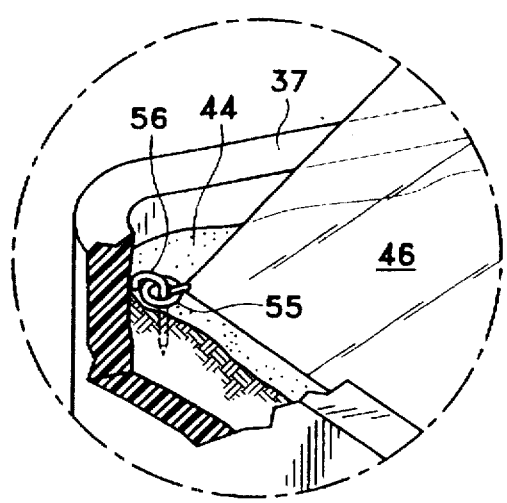
FIG. 11 is a perspective cut-away view of the corner of the planter and tent of FIG. 10.

To maximize the use of the radial garden 20 in northern climates, it may be necessary to set plants out or start seedlings before the commencement of the regular growing season. Small tents 45 which function as individual greenhouses are used in each planter rather than using a large one over the whole system. The tents permit separate control in each planter so that different plants with different requirements may be grown. The tents, as seen in FIG. 10, are made of a transparent flexible polymeric material and have three equal triangular walls 46 and no bottom. There is a rigid cap 51 at the apex of the tent which rests on a tent support post 52. The tent support post 52 with a pointed bottom end 53 passes through a tent post suppport which consists of a hollow drum 61 with a horizontal opening into which a set screw 62 is maintained. A broad circular flange 54 radiates from the drum and rests on the soil to support the post 52. When the tent support post is positioned so that the walls 46 of the tent are taut, the set screw 62 is tightened against the post. Each corner of the tent has a grommet or anchoring loop 55 secured to it. A U-shaped pin 56 is used to anchor a tent corner at each corner of the planter as seen in FIG. 11. The arms of the U-shaped pin 56 are embedded into the soil and hold the anchoring loop 55 securely.

There is an opening 50 in one of the tent walls 46 with a flap 47 covering the opening 50. A small fastening tab 48 of hook type fastener is placed at the bottom of the flap 47 and a reciprocating tab 49 of loop type fastener is placed on the tent wall 46 just below the opening 50 to secure the flap in closed position. The opening 50 enables access to the plants during the time the tent is in place and is necessary for proper placement of the tent. If too much heat is generated in the small tents, plants can be damaged or destroyed. Opening the flaps will reduce heat build-up and enable temperature and humidity control within the tents.

To properly set the tent, the support pole is embedded into the soil, the tent is set over the pole with the tent cap 51 resting on the pole. Each corner of the tent is then anchored as described above. Access to the interior of the tent is attained through the opening 50 to raise the support pole 52 until the tent walls are taut, at which time the set screw 62 is tightened to maintain the support pole 52 in proper height to keep the tent walls taut.

Figure 13:
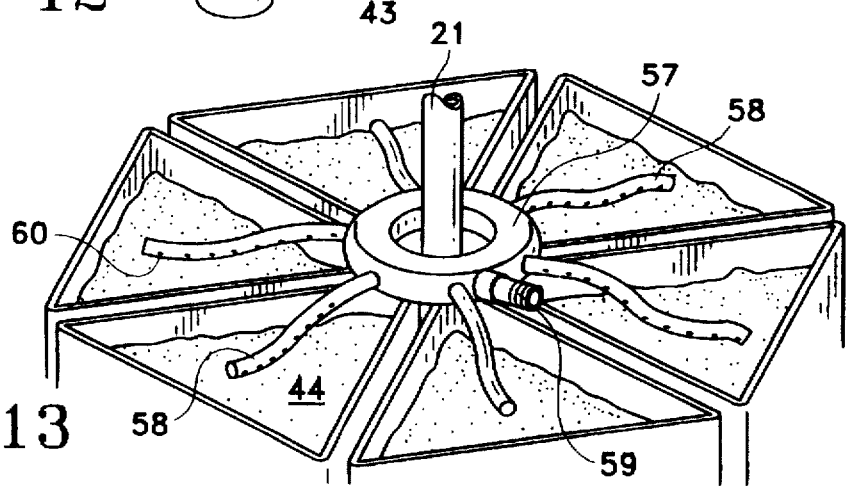
FIG. 13 is a perspective view of the lower portion of the present invention without the climbing screens and showing the watering collar in place.

Watering a garden using the common lawn sprinklers wastes a lot of water especially on a patio or deck. A watering collar 57 prevents waste and puts the water where needed, at the base of the plant so it goes directly to the roots. The watering collar 57 is a hollow circular tube that fits around the central support post 21. A garden hose adapter 59 extends from and cooperates with the collar 57 as do six irrigation arms 58. Each irrigation arm 58 is a length of flexible tubing cooperating with the interior of the watering collar 57 at one end and closed at the other end. There is a plurality of openings 60 along the bottom of each irrigation arm 58 through which the water is dispensed. (See FIG. 13) The flexible tubing enables the irrigation arms to be arranged through the plants as needed. Liquid fertilizers can also be introduced through the irrigation collar.

Instead of the openings 60 the irrigation arms 58 may have one or more nozzles (not illustrated). These can be set at the roots of individual plants and opened as needed.

The planters are in the form of equilateral triangles which fit securely between the lower radial arms 30 as seen in FIG. 6. This shape keeps the planting surface within the area defined by the radial arms. The open bottom planters may be sold as three sections that are bolted or otherwise connected together during assembly. For a patio planter, a triangular bottom section with drainage openings is added and rests on the support rim. This form of planter together with the disassembled radial support system with the central post in sections makes an easily transportable package.

The radial garden of the present invention can be constructed with four or more radial arms. The optimum garden has six radial arms as illustrated with, the upper radial arms 25 at six to seven feet (1.8 to 2.1 meters) above the ground, and all radial arms 3.5 to 4.0 feet (1.08 to 1.23 meters) long (the radius of the system). The side dimensions of each planter will be the same radius length. When a 3.5 to 4.0 foot triangular planter is used a planting arrangement of 24 plants is possible, with 18 climbing plants 63 designated by an "X" in the planting diagram seen in FIG. 2 and 6 non-climbing plants 64 designated by an "O".

When the radial garden is used on the ground, the central support post 21 should be embedded into the earth, optimally from 12 to 18 inches (30 to 46 cm). This depth will provide good stability to the system. The leveling means must be used when the ground is uneven because all radial arms must be horizontally oriented to prevent tipping and maintain a taut climbing surface. If the radial garden is to be used on ground that cannot be penetrated to sufficient depth, the support post 21 should be used with the patio support base 34, the support collar 42, and the planters. The anchoring strips 43 should also be used under such conditions. Either the bottomless planter 35 or the patio planter 38 may be used.

The planters should be eight to ten inches (20 to 25 cm) deep and when used in the ground should be set two to six inches (5 to 15 cm) into the soil. A minimum of six inches (15 cm) of potting soil should be placed in each planter. The patio planters should be 12 to 18 inches (30 to 46 cm) deep and contain 10 to 16 inches (25 to 40 cm) of potting soil.

The climbing surface can be any type of screen, mesh or series of strings. A nylon mesh with a 3"×4" (8 cm×10 cm) grid provides the minimal area opening. This will support a wide variety of plants.

The tents 45 not only function as greenhouses for early plantings, but can be set up in the planters after the growing season is over and the plants have been removed. Any late season or winter sun generates heat under the tent. Such heat kills many soil-bourne micro-organisms so the soil is in better condition for the next season's plantings.

While two embodiments of the invention have been illustrated and described in detail it is to be understood that this invention is not limited thereto and may be otherwise practiced within the scope of the following claims.

I claim:

1. A radial garden support system enabling maximum space utilization of a small garden area and support for a variety of climbing plants as well as providing growing space for non-climbing plants, said support system comprising:

a rigid central support member of a height suitable to support a variety of climbing plants and having an upper end and a lower end;

at least four upper and four lower radial arm members of equal length, all of said radial arm members having a proximal end and a distal end;

two bracket means for supporting the radial arm members at their proximal ends, each bracket means having at least four symmetrically positioned sleeves radiating horizontally therefrom, each of which holds a radial arm member, one bracket means demountably affixed about the upper end of said central support member and the other demountably affixed about the lower end of said central support member and both of said bracket means being vertically adjustable;

leveling means disposed at the distal end of each lower radial arm member for maintaining same in a horizontal orientation when said support system is placed on uneven ground;

climbing means suspended between the upper and lower radial arm members for supporting the climbing plants as they grow; and horizontal restraining means for restraining the support system against lateral forces.

2. A radial garden support system as in claim 1 wherein the climbing means comprises panels of widely spaced mesh, each affixed to an upper radial arm member and to the lower radial arm member directly below it.

3. A radial garden support system as in claim 1 further comprising at least two fastening means disposed along the length of each radial arm member for securing the climbing means and whereby the bracket means are vertically adjusted to maintain the climbing means taut.

4. A radial garden support system as in claim 1 further comprising planting means disposed between the lower radial arm members for containment of potting soil and for providing a defined growing area for the plants.

5. A radial garden support system as in claim 4 wherein the planting means comprises a container having three walls, each wall having an interior and an exterior, an upper edge and a lower edge, and there being a support rim along the interior lower edge of each wall wherein the weight of potting soil on said support rim maintains said planting means in a substantially horizontal orientation.

6. A radial garden support system as in claim 5 wherein the lengths of at least two walls of the planting means are substantially equal to the lengths of the radial arm members.

7. A radial garden support system as in claim 4 wherein the planting means comprises a container having three walls and a bottom, the bottom having at least one aperture means for providing drainage for the plants.

8. A radial garden support system as in claim 7 wherein the lengths of at least two walls of the planting means are substantially equal to the lengths of the radial arm members.

9. A radial garden support system as in claim 4 wherein the horizontal restraining means comprises a support collar means being substantially tubular and being disposed about said central support member near the lower end thereof, said collar means for enabling said planting means to make contact with the central support member, whereby when said planting means are moved against said collar means they provide weight against the lower end of the central support member and horizontal restraint to the system.

10. A radial garden support system as in claim 4 further comprising anchoring means for prevention of ripping of the support system, said anchoring means being substantially a strip of strong, flexible material at least the length of a radial arm member and being disposed over each of said lower radial arm members and under the two planting means on either side thereof, whereby the weight of said planting means against said anchoring means prevents the support system from tipping over.

11. A radial garden support system as in claim 4 further comprising greenhouse means for maintaining optimum temperature and humidity for the plants, said greenhouse means being in the form of flexible, transparent tents, each having at least three walls, a reinforced apex and bottom edges, whereby said greenhouse means are disposed within said planting means; support means for supporting said greenhouse means and for maintaining same in upright configuration with the walls being taut; and anchoring means for anchoring said greenhouse means at the bottom edges thereof so the greenhouse means cannot be displaced by wind.

12. A radial garden support system as in claim 11 wherein each of said greenhouse means has an aperture means in at least one wall for providing access to cultivate and treat said plants, and cover means for maintaining closure of said aperture means and for opening said aperture means to control temperature and humidity conditions within said greenhouse means and for obtaining access to said plants.

13. A radial garden support system as in claim 1 wherein the horizontal restraining means comprises an extension to the lower end of the central support member of sufficient length for being inserted a substantial distance into the earth, said extension having an upper end and a lower end, the lower end being pointed for ease of insertion.

14. A radial garden support system as in claim 1 further comprising a supporting base means for accepting the lower end of the central support member and for providing support and stability thereto.

15. A radial garden support system as in claim 1 further comprising a watering collar disposed about the lower end of the central support member, said watering collar being a hollow circular tube with a connection means cooperating therewith for attachment of a water supply, and said watering collar having at least one flexible irrigation means cooperating therewith for introducing water at the bases of the plants.

* * * * *

UNITED STATES PATENT AND TRADEMARK OFFICE
CERTIFICATE OF CORRECTION

PATENT NO. : 5,752,341
DATED : May 19, 1998
INVENTOR(S) : Kenneth Goldfarb

It is certified that error appears in the above-indentified patent and that said Letters Patent is hereby corrected as shown below:

In claim 10, column 7, line 43, delete "ripping", and substitute –tipping--.

Signed and Sealed this

Seventh Day of July, 1998

Attest:

BRUCE LEHMAN

Attesting Officer

Commissioner of Patents and Trademarks